United States Patent
Lee et al.

(10) Patent No.: US 11,630,521 B2
(45) Date of Patent: Apr. 18, 2023

(54) ELECTRONIC DEVICE FOR SUPPORTING FINGER PINCH INTERACTION USING RETURN LOSS OF RADIO FREQUENCY SIGNAL AND OPERATING METHOD THEREOF

(71) Applicant: Korea Advanced Institute of Science and Technology, Daejeon (KR)

(72) Inventors: Geehyuk Lee, Daejeon (KR); Daehwa Kim, Daejeon (KR); Keunwoo Park, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 17/540,226

(22) Filed: Dec. 1, 2021

(65) Prior Publication Data
US 2022/0244787 A1 Aug. 4, 2022

(30) Foreign Application Priority Data

Feb. 4, 2021 (KR) .......................... 10-2021-0016198

(51) Int. Cl.
*G06F 3/01* (2006.01)
*G01S 5/14* (2006.01)

(52) U.S. Cl.
CPC .............. *G06F 3/017* (2013.01); *G01S 5/14* (2013.01)

(58) Field of Classification Search
None
See application file for complete search history.

(56) References Cited

U.S. PATENT DOCUMENTS

| | | |
|---|---|---|
| 2016/0320853 A1 | 11/2016 | Lien et al. |
| 2017/0049352 A1* | 2/2017 | Mirov ................... A61B 5/0531 |
| 2017/0296363 A1* | 10/2017 | Yetkin ..................... G06F 3/015 |
| 2019/0018364 A1* | 1/2019 | Kim ....................... H04M 3/567 |
| 2020/0408895 A1 | 12/2020 | Holman |
| 2021/0156986 A1* | 5/2021 | Shee ....................... H01Q 1/273 |
| 2021/0294431 A1* | 9/2021 | Clark .................... G06F 3/0205 |
| 2022/0229495 A1* | 7/2022 | Luo ........................ G06F 3/0488 |

OTHER PUBLICATIONS

Bin Xu et al., "Classification of Finger Movements Based on Reflection Coefficient Variations of a Body-Worn Electrically Small Antenna", IEEE Antennas and Wireless Propagation Letters, vol. 16, pp. 1812-1815, Mar. 10, 2017.
Chun-Hsi Su et al., "An Antenna Sensor to Identify Finger Postures", 2019 IEEE Eurasia Conference on IOT, Communication and Engineering (ECICE), pp. 571-574, Dec. 26, 2019.
Yi-Chen Lai et al., "Finger Gesture Sensing and Recognition Using a Wi-Fi-based Passive Radar", 2019 IEEE MTT-S International Microwave Symposium (IMS), pp. 293-296, May 7, 2019.

* cited by examiner

*Primary Examiner* — Parul H Gupta
(74) *Attorney, Agent, or Firm* — PCFB LLC (57) ABSTRACT

Various embodiments relate to an electronic device for supporting a finger pinch interaction using a return loss of a radio frequency signal and an operating method thereof. The electronic device is configured to measure a return loss of an antenna while radiating a radio frequency signal through the antenna and to detect whether a thumb and a finger touch each other within a predetermined distance from the antenna based on the measured return loss. Accordingly, there can be provided an interaction for the touch between the thumb and the finger.

20 Claims, 9 Drawing Sheets

ELECTRONIC DEVICE FOR SUPPORTING FINGER PINCH INTERACTION USING RETURN LOSS OF RADIO FREQUENCY SIGNAL AND OPERATING METHOD THEREOF

CROSS-REFERENCES TO RELATED APPLICATIONS

This application is based on and claims priority under 35 U.S.C. 119 to Korean Patent Application No. 10-2021-0016198, filed on Feb. 4, 2021 in the Korean intellectual property office, the disclosure of which is herein incorporated by reference in its entirety.

TECHNICAL FIELD

Various embodiments relate to an electronic device for supporting a finger pinch interaction using a return loss of a radio frequency signal and an operating method thereof.

BACKGROUND OF THE DISCLOSURE

A technology for supporting a finger pinch interaction has been chiefly realized using a camera. The technology detects whether a thumb and a finger have touched each other based on information on positions of the thumb and the finger captured by an RGB camera or a depth camera. However, a touched state of the thumb and the finger may not be detected through the camera because the finger is covered by the back of a hand, another finger, etc. depending on a position and direction of the hand. A finger position tracking method not subjected to a position and angle of the camera includes a method using the deformation of the back of a hand according to a motion of a finger, a method using the deformation of the wrist and an arm, etc. However, it is very difficult to detect whether a touch according to fine motions is made because in the methods, a finger position is indirectly estimated from the deformation of another body portion not the finger. A Doppler radar can detect finger motions, and therefore it is often used to recognize a gesture. However, it cannot measure finger positions, and therefore it cannot be used to detect the touch state of the thumb and the finger.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Various embodiments provide an electronic device capable of precisely detecting whether a thumb and a finger touch each other by sensing a change in the return loss of an antenna attributable to a finger pinch formed when the thumb and the finger touch each other and an operating method thereof.

An operating method of an electronic device according to various embodiments may include measuring a return loss of an antenna while radiating a radio frequency signal through the antenna, and detecting whether a thumb and a finger touch each other within a predetermined distance from the antenna based on the measured return loss.

An electronic device according to various embodiments may include an antenna, and a processor connected to the antenna and configured to measure a return loss of the antenna while radiating a radio frequency signal through the antenna and to detect whether a thumb and a finger touch each other within a predetermined distance from the antenna based on the measured return loss.

An electronic device according to various embodiments is an electronic device used in at least one of virtual reality (VR), augmented reality (AR) or mixed reality (MR), and includes a controller gripped by a hand of a user, an antenna disposed in the controller, and a processor connected to the antenna. The processor may be configured to measure a return loss of the antenna while radiating a radio frequency signal through the antenna, detect whether a thumb and a finger of the hand touch each other based on the measured return loss, and provide an interaction for the touch between the fingers.

According to various embodiments, the electronic device can easily detect whether a thumb and a finger touch each other by using the antenna. Accordingly, the electronic device can also precisely and stably detect fine motions of the thumb and the finger for a touch between the thumb and the finger. Accordingly, the electronic device can easily recognize a pinch gesture indicating a finger pinch, and can provide an interaction in response to the pinch gesture. Such an electronic device will be effectively used in at least one of virtual reality (VR), augmented reality (AR) or mixed reality (MR).

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

While illustrative embodiments have been illustrated and described, it will be appreciated that various changes can be made therein without departing from the spirit and scope of the disclosure.

Hereinafter, various embodiments of this document are described with reference to the accompanying drawings.

When a radio frequency signal travels through a medium, if impedance of the medium suddenly changes, some of the input signal is reflected and returned, and the remainder of the input signal passes through the medium. A ratio of the input signal and the returned signal is called a return loss. When a radio frequency signal is incident on an antenna, some of the signal is reflected due to an impedance difference between the antenna and a signal generator, which is called a return loss of the antenna. A vector network analyzer (hereinafter referred to as a "VNA") measures an antenna parameter such as a return loss. When a signal generator of the VNA inputs a signal having a high frequency to an antenna connected to a design under test (DUT) port, a return loss of the antenna can be measured.

Figure 1:
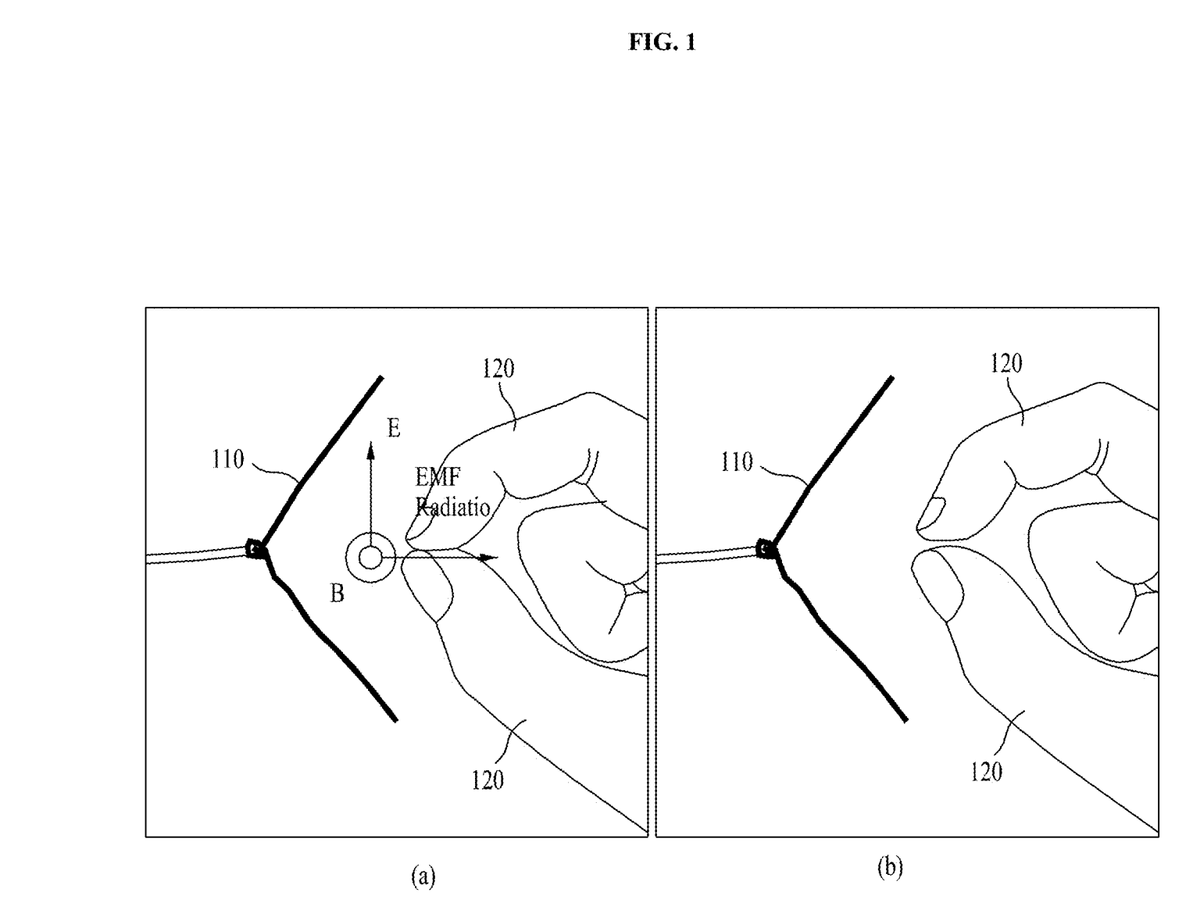
FIGS. 1, 2 and 3 are diagrams for describing operation characteristics according to various embodiments.
Figure 2:
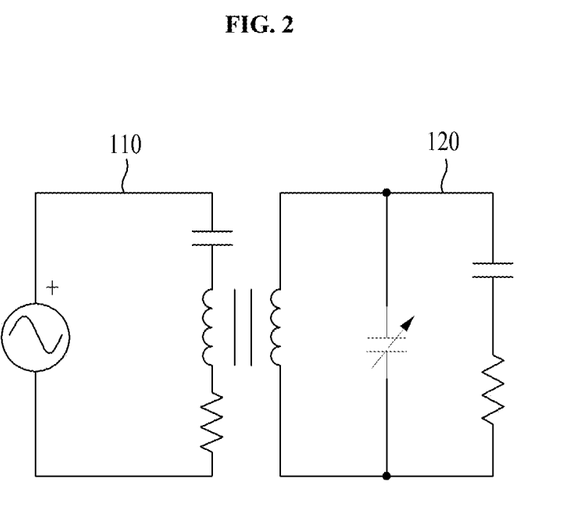
Figure 3:
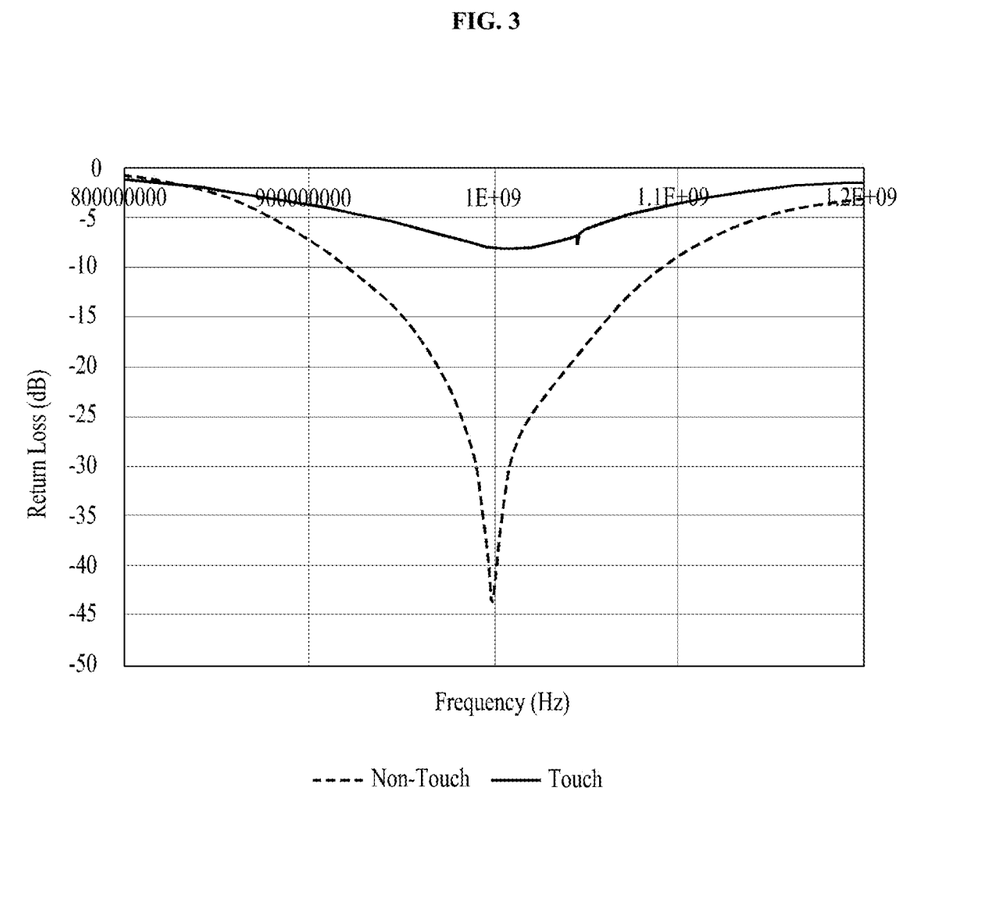

FIGS. 1, 2 and 3 are diagrams for describing operation characteristics according to various embodiments.

Referring to FIGS. 1, 2 and 3, various embodiments may use a change in the return loss, which is measured when pieces of impedance of an antenna 110, and a thumb and a finger 120 are electromagnetically combined in order to detect whether the thumb and the finger 120 of a person have touched each other. Hereinafter, a touch between the thumb and the finger 120 may indicate that a finger pinch is formed by the thumb and the finger 120. In this case, the finger pinch may be formed when the thumb and the finger 120 directly come into contact with each other, may be formed by the thumb and the finger 120 and a conductor as the thumb and the finger pick up the conductor, or may be formed by the thumb and the finger and a conductor as the thumb and the finger 120 simultaneously come into contact with the skin. A non-touch between the thumb and the finger 120 may indicate that the thumb and the finger 120 are separated from each other without touching, that is, isolated from each other.

The body of a person is a conductor with respect to a radio frequency signal, so an electric current may be induced into the thumb and the finger 120 by an electric field of the radio frequency signal radiated by the antenna 110. At this time, an equivalent circuit for the antenna 110 and the thumb and the finger 120 may be represented as illustrated in FIG. 2. Accordingly, pieces of impedance of the antenna 110 and the thumb and the finger 120 close to each other may be combined due to inductance components of the antenna 110 and the thumb and the finger 120. At this time, a finger pinch may be formed as the thumb and the finger 120 touch each other as illustrated in FIG. 1(a), or capacitance components in the thumb and the finger 120 may change as the thumb and the finger 120 are separated from each other without touching as illustrated in FIG. 1(b). A change in the capacitance components according to whether the thumb and the finger 120 touch each other results in a change in combined impedance of the antenna 110 and the thumb and the finger 120, which may cause a change in a measured return loss.

As illustrated in FIG. 3, a change in a measured return loss may indicate a given tendency and a great change value depending on whether the thumb and the finger 120 touch each other. That is, a measured return loss may be relatively great when the thumb and the finger 120 touch each other, and a measured return loss may be relatively small when the thumb and the finger 120 do not touch each other. For example, a measured return loss may be greater than −20 dB when the thumb and the finger 120 touch each other, and a measured return loss may be equal to or smaller than −20 dB when the thumb and the finger 120 do not touch each other. In other words, if the thumb and the finger 120 touch each other and then separated from each other, a measured return loss may be significantly reduced. For example, a change value of the measured return loss may be greater than 20 dB.

Figure 4:
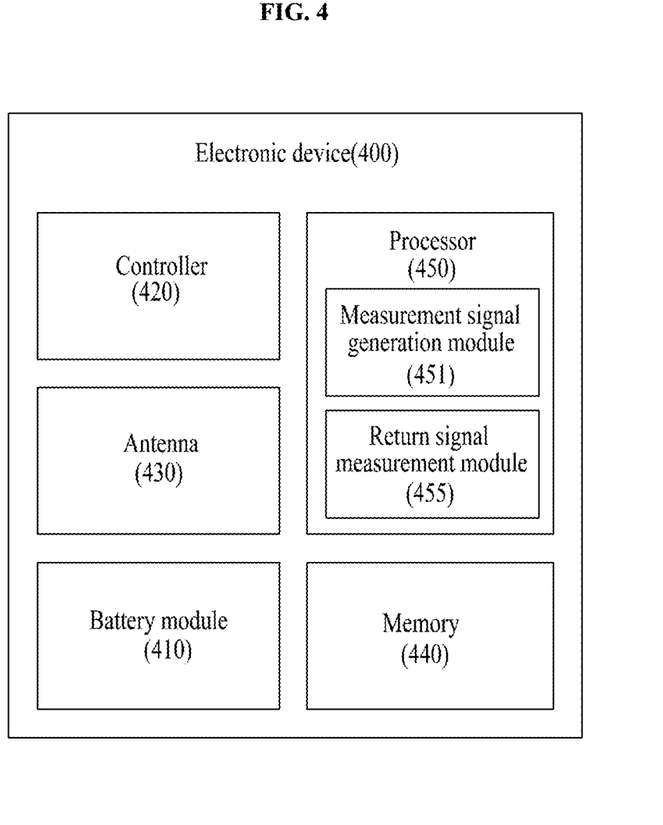
FIG. 4 is a diagram illustrating an electronic device according to various embodiments.
Figure 5:
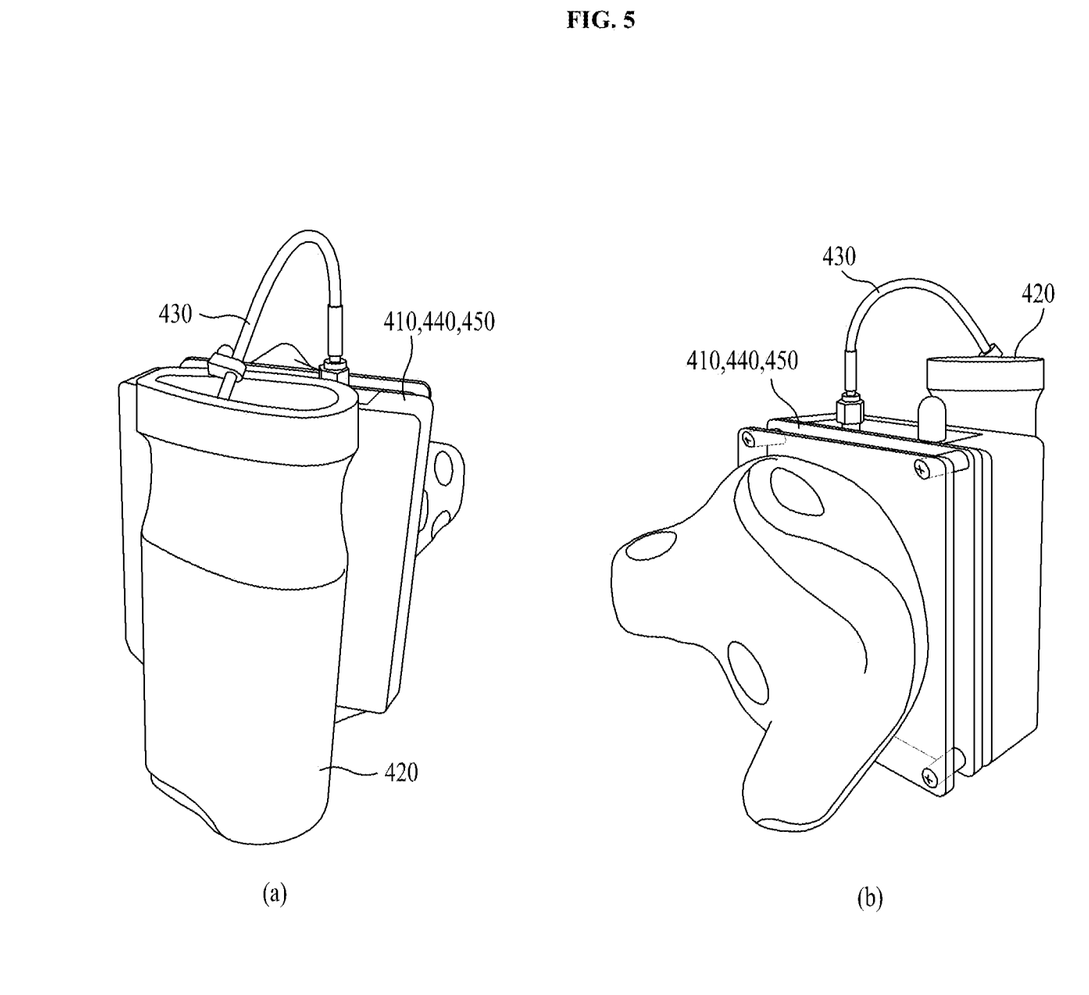
FIG. 5 is a diagram illustrating an example of the electronic device of FIG. 4.
Figure 6:
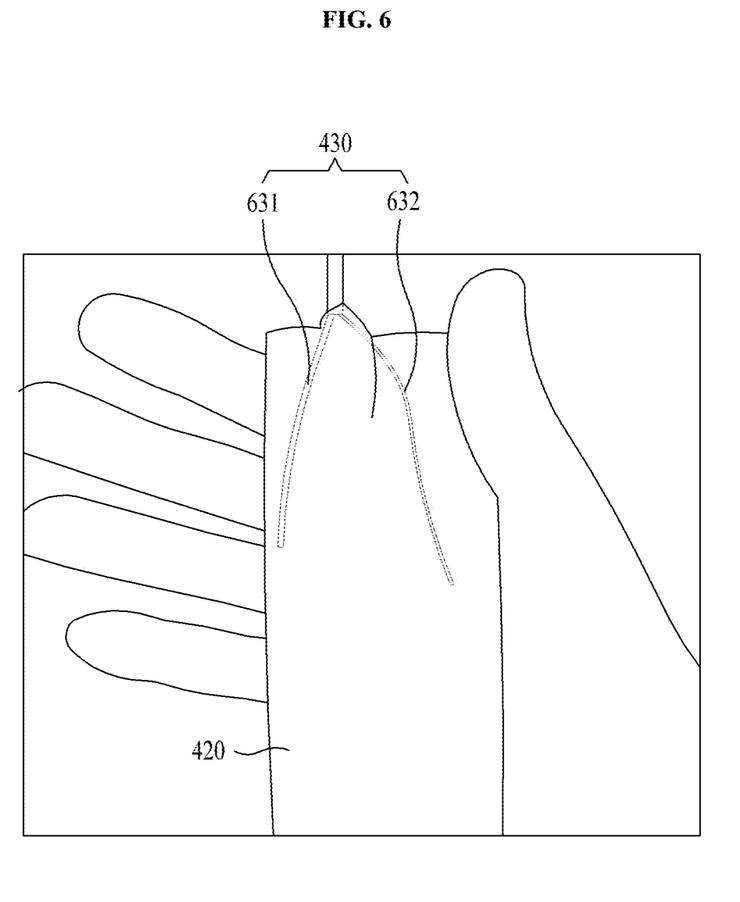
FIG. 6 is a diagram for illustratively describing an antenna of FIG. 5.
Figure 7:
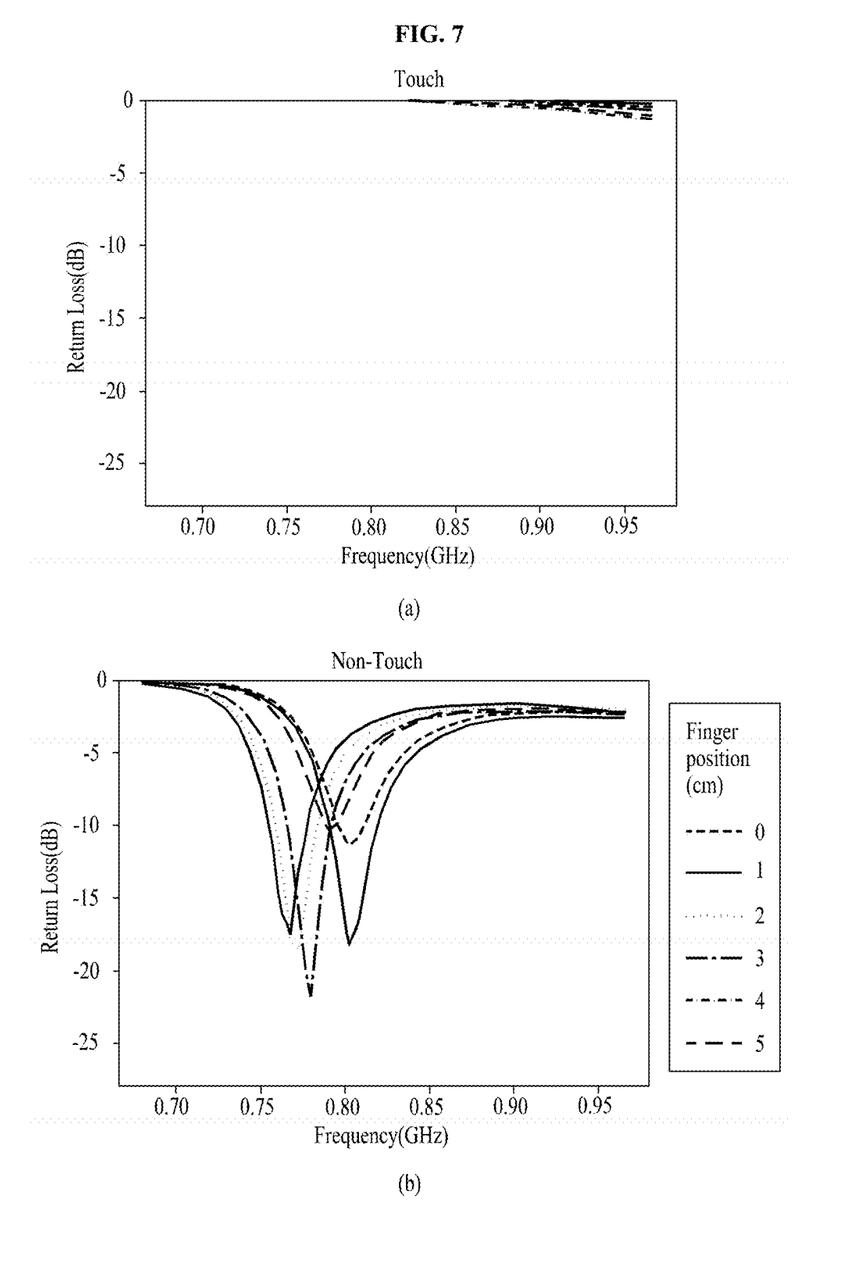
FIG. 7 is a diagram for illustratively describing return losses estimated according to various embodiments.
Figure 8:
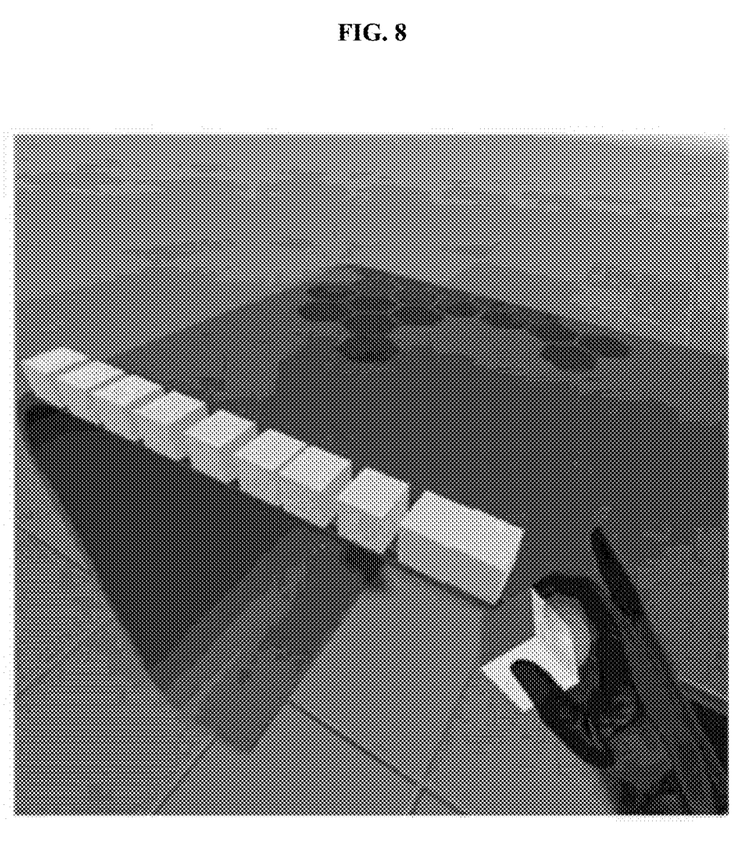
FIG. 8 is a diagram for illustratively describing an interaction provided according to various embodiments.

FIG. 4 is a diagram illustrating an electronic device 400 according to various embodiments. FIG. 5 is a diagram illustrating an example of the electronic device 400 of FIG. 4. FIG. 6 is a diagram for illustratively describing an antenna 430 of FIG. 5. FIG. 7 is a diagram for illustratively describing return losses estimated according to various embodiments. FIG. 8 is a diagram for illustratively describing an interaction provided according to various embodiments.

Referring to FIG. 4, the electronic device 400 according to various embodiments may include at least one of a battery module 410, a controller 420, an antenna 430, a memory 440 or a processor 450. In some embodiments, at least one of the components of the electronic device 400 may be omitted, and at least another component may be added to the electronic device 400. In some embodiments, at least two of the components of the electronic device 400 may be embodied as one integrated circuit. In some embodiments, the electronic device 400 may be an electronic device used in at least one of virtual reality (VR), augmented reality (AR) or mixed reality (MR).

The battery module 410 may manage power to be used in at least one of the components of the electronic device 400. The battery module 410 may include a battery and a power management module. The battery may substantially store power. In this case, the battery may be implemented in a way to be detachable from the electronic device 400. For example, the battery may include a primary cell which cannot be recharged, a rechargeable secondary cell or a fuel cell. The power management module may manage power of the battery. In this case, the power management module may manage power supplied from the battery to at least one of the components of the electronic device 400.

The controller 420 may be provided in order to generate a user's input. In this case, the controller 420 may generate a user's input based on a motion of the user. In some embodiments, the controller 420 may include at least one button. According to various embodiments, the controller 420 may be gripped by the thumb and the finger of a user. In this case, one axis through which the controller 420 is penetrated may be defined. The controller 420 may be gripped by the thumb and the finger on the basis of the one axis. Furthermore, the thumb and the finger may touch each other or be separated from each other without touching while gripping the controller 420.

The antenna 430 may be provided in order to radiate a radio frequency signal. In this case, as illustrated in FIG. 5, the antenna 430 may be disposed in the controller 420. Accordingly, when the controller 420 is gripped by the thumb and the finger, the thumb and the finger may be placed within a predetermined distance from the antenna 430. In this case, the antenna 430 may be disposed in a length direction parallel to one axis defined in the controller 420. Accordingly, when the thumb and the finger grip the controller 420, the length direction in which the thumb and the finger touch may be parallel to the length direction of the antenna 430. For example, as illustrated in FIG. 6, an antenna 430 may be embodied in a V form. That is, the antenna 430 may include a feeding line 631 to which an electric current is supplied by the processor 450 and a ground line 633 for the ground. The feeding line 631 and the ground line 633 may form a V form without electrically coming into contact with each other.

The memory 440 may store various data used by at least one component of the electronic device 400. For example, the memory 440 may include at least one of a volatile memory or a non-volatile memory. The data may include at least one program and input data or output data related to the program. The program may be stored in the memory 440 as software including at least one instruction, and may include at least one of an operating system, middleware or an application.

The processor 450 may control at least one component of the electronic device 400 by executing a program stored in the memory 440. Accordingly, the processor 450 may perform data processing or an operation. In this case, the processor 450 may execute an instruction stored in the memory 440.

The processor 450 may detect whether the thumb and the finger touch each other through the antenna 430. To this end, the processor 450 may measure a return loss of the antenna 430 while radiating a radio frequency signal through the antenna 430. Furthermore, the processor 450 may detect whether the thumb and the finger touch each other within a predetermined distance from the antenna 430 based on the measured return loss. That is, as illustrated in FIG. 7, while the thumb and the finger grip the controller 420, the processor 450 may detect whether the thumb and the finger touch each other based on the measured return loss. As described above, the return loss of the antenna 430 changes in response to a change in combined impedance between the antenna 430 and the thumb and the finger according to the touch between the thumb and the finger. In response thereto, the processor 450 may detect whether the thumb and the finger touch each other based on the measured return loss.

For example, the processor 450 may include a measurement signal generation module 451 and a return signal measurement module 455. For example, the measurement signal generation module 451 and the return signal measurement module 455 may constitute a VNA. The measurement signal generation module 451 may play a role as a signal generator of the VNA. The measurement signal generation module 451 may radiate a radio frequency signal through the antenna 430. That is, the measurement signal generation module 451 may supply an electric current to the feeding line 631 of the antenna 430, and may radiate the radio frequency signal by using the feeding line 631 and the ground line 633. The return signal measurement module 455 may measure a return loss of the antenna 430. Furthermore, the return signal measurement module 455 may detect whether the thumb and the finger touch each other based on the measured return loss. At this time, the return signal measurement module 455 may detect whether the thumb and the finger touch each other by comparing the measured return loss with a predetermined reference value. In this case, when the measured return loss is greater than the reference value, the return signal measurement module 455 may detect a touch between the thumb and the finger. Furthermore, the return signal measurement module 455 may detect the touch between the thumb and the finger when a change value of the measured return loss is greater than a predetermined threshold value while tracking the change value.

Accordingly, the processor 450 may provide an interaction for the touch between the thumb and the finger. At this time, the processor 450 may recognize a pinch gesture indicating a finger pinch from a touch between the thumb and the finger, and may provide an interaction in response to the pinch gesture. In this case, the finger pinch may be formed as the thumb and the finger directly come into contact with each other, may be formed by the thumb and the finger and a conductor as the thumb and the finger pick up the conductor, or may be formed by the thumb and the finger and a conductor as the thumb and the finger simultaneously come into contact with the skin. The interaction may include an interaction in one of VR, AR or MR. For example, the interaction may include at least one of the execution of a predetermined function, the pick-up of a virtual object at positions of the thumb and the finger, or the entry of text at the positions of the thumb and the finger. For example, as illustrated in FIG. 8, the processor 450 may execute the pick-up of a virtual object.

Figure 9:
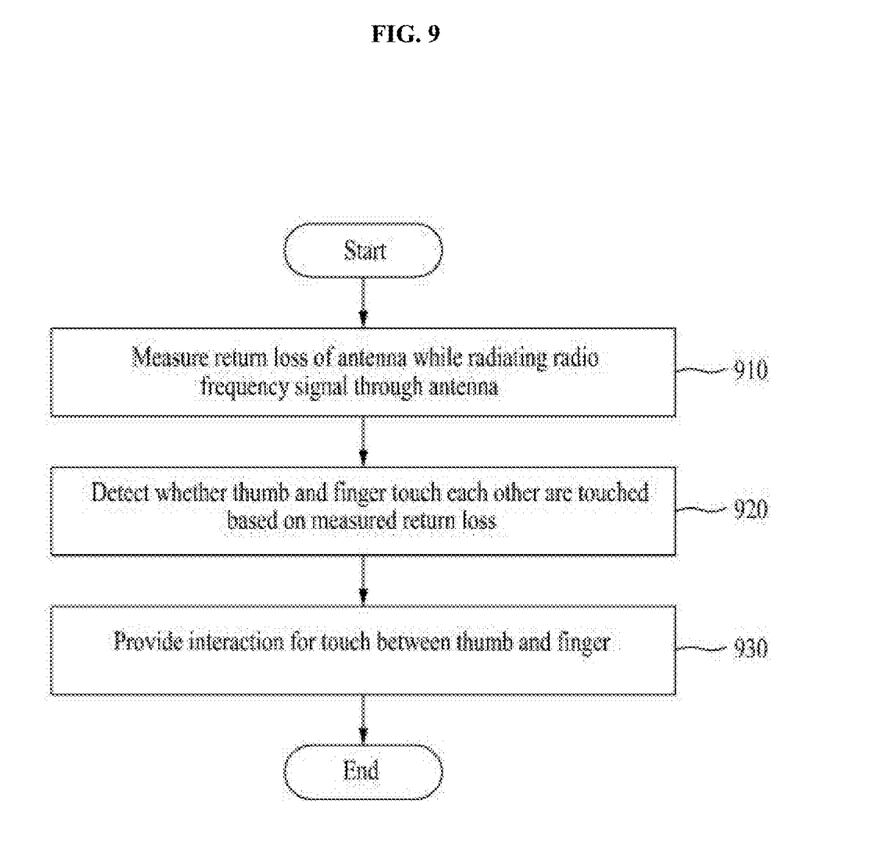
FIG. 9 is a diagram illustrating an operating method of the electronic device according to various embodiments.

FIG. 9 is a diagram illustrating an operating method of the electronic device 400 according to various embodiments.

Referring to FIG. 9, in step 910, the electronic device 400 may measure a return loss of the antenna 430 while radiating a radio frequency signal through the antenna 430. While a thumb and a finger grip the controller 420, the processor 450 may radiate the radio frequency signal through the antenna 430. For example, the processor 450 may further include a grip sensor (not illustrated) disposed in the controller 420, and may detect whether the thumb and the finger grip the controller 420 through the grip sensor. Thereafter, if it is detected that the thumb and the finger grip the controller 420, the processor 450 may radiate the radio frequency signal through the antenna 430. Furthermore, the processor 450 may measure a return loss of the antenna 430 while radiating the radio frequency signal through the antenna 430. In this case, the return loss of the antenna 430 may change in response to a change in combined impedance between the antenna 430 and the thumb and the finger according to the touch between the thumb and the finger.

In step 920, the electronic device 400 may detect whether the thumb and the finger touch each other based on the measured return loss. While the thumb and the finger grip the controller 420, the processor 450 may detect whether the thumb and the finger touch each other based on the measured return loss, as illustrated in FIG. 7. As described above, the return loss of the antenna 430 changes in response to a change in combined impedance between the antenna 430 and the thumb and the finger according to the touch between the thumb and the finger. In response thereto, the processor 450 may detect whether the thumb and the finger touch each other based on the measured return loss. In this case, the processor 450 may detect whether the thumb and the finger touch each other by comparing the measured return loss with a predetermined reference value. In this case, when the measured return loss is greater than the reference value, the processor 450 may detect a touch between the thumb and the finger. For example, the reference value may be −20 dB. That is, when the measured return loss is greater than −20 dB, the processor 450 may detect a touch between the thumb and the finger. When the measured return loss is equal to or smaller than −20 dB, the processor 450 may detect a non-touch between the thumb and the finger, that is, that the thumb and the finger do not touch each other. Furthermore, after the touch between the thumb and the finger is detected, the processor 450 may detect the touch between the thumb and the finger when a change value of the measured return loss is greater than a predetermined threshold value while tracking the change value. For example, the threshold value may be 20 dB. That is, when the change value of the measured return loss is greater than 20 dB, the processor 450 may detect the touch between the thumb and the finger, that is, the thumb and the finger touch each other.

In step 930, the electronic device 400 may provide an interaction for the touch between the thumb and the finger. When the touch between the thumb and the finger is detected in step 920, the processor 450 may provide an interaction for the touch between the thumb and the finger. At this time, the processor 450 may recognize a pinch gesture indicating a finger pinch based on the touch between the thumb and the finger, and may provide an interaction in response to the pinch gesture. In this case, the finger pinch may be formed as the thumb and the finger directly come into contact with each other, may be formed by the thumb and the finger and a conductor as the thumb and the finger pick up the conductor, or may be formed by the thumb and the finger and a conductor as the thumb and the finger simultaneously come into contact with the skin. The interaction may include an interaction in one of VR, AR or MR. For example, the interaction may include at least one of the execution of a predetermined function, the pick-up of a virtual object at positions of the thumb and the finger, or the entry of text at the positions of the thumb and the finger.

According to various embodiments, the electronic device 400 can easily detect whether the thumb and the finger touch each other by using the antenna 430. Accordingly, the electronic device 400 can precisely and stably detect even fine motions of the thumb and the finger for a touch between the thumb and the finger. Accordingly, the electronic device 400 can easily recognize a pinch gesture indicating a finger pinch, and can provide an interaction in response to the pinch gesture. The electronic device 400 will be effectively used in at least one of VR, AR or MR.

An operating method of the electronic device 400 according to various embodiments may include a step of measuring a return loss of the antenna 430 while radiating a radio frequency signal through the antenna 430 (step 910), and a step of detecting whether a thumb and a finger touch each other within a predetermined distance from the antenna 430 based on the measured return loss (step 920).

According to various embodiments, the operating method of the electronic device 400 may further include a step of providing an interaction for the touch between the thumb and the finger (step 930).

According to various embodiments, the return loss of the antenna 430 may change in response to a change in combined impedance between the antenna 430 and the thumb and the finger according to the touch between the thumb and the finger.

According to various embodiments, the step of detecting whether the thumb and the finger touch each other (step 920) may include a step of detecting a touch between the thumb and the finger when the measured return loss is greater than a predetermined reference value.

According to various embodiments, the step of detecting whether the thumb and the finger touch each other (step 920) may further include steps of tracking a change value of the measured return loss and detecting the touch between the thumb and the finger when a change value is greater than a predetermined threshold value.

According to various embodiments, the touch between the thumb and the finger may indicate that a finger pinch is formed as the thumb and the finger come into contact with each other.

According to various embodiments, the interaction may include an interaction in one of VR, AR or MR.

According to various embodiments, the antenna 430 may be disposed in the controller 420 gripped by the thumb and the finger.

According to various embodiments, the interaction may include at least one of the execution of a predetermined function, the pick-up of a virtual object at positions of the thumb and the finger, or the entry of text at the positions of the thumb and the finger.

The electronic device 400 according to various embodiments may include the antenna 430, and the processor 450 connected to the antenna and configured to measure a return loss of the antenna 430 while radiating a radio frequency signal through the antenna 430 and to detect whether a thumber and a finger touch each other within a predetermined distance from the antenna 430 based on the measured return loss.

According to various embodiments, the processor 450 may be configured to provide an interaction for the touch between the thumb and the finger.

According to various embodiments, the return loss of the antenna 430 may change in response to a change in combined impedance between the antenna 430 and the thumb and the finger according to the touch between the thumb and the finger.

According to various embodiments, the processor 450 may be configured to detect the touch between the thumb and the finger when the measured return loss is greater than a predetermined reference value.

According to various embodiments, the processor 450 may be configured to track a change value of the measured return loss and to detect the touch between the thumb and the finger when the change value is greater than a predetermined threshold value.

According to various embodiments, the touch between the thumb and the finger may indicate that a finger pinch is formed as the thumb and the finger come into contact with each other.

According to various embodiments, the interaction may include an interaction in one of VR, AR or MR.

According to various embodiments, the electronic device 400 may include an electronic device including the controller 420 gripped by the thumb and the finger.

According to various embodiments, the antenna 430 may be disposed in the controller 420.

According to various embodiments, the interaction may include at least one of the execution of a predetermined function, the pick-up of a virtual object at positions of the thumb and the finger, or the entry of text at the positions of the thumb and the finger.

According to various embodiments, the controller 420 may be gripped by the thumb and the finger on the basis of one axis defined to penetrate the controller 420.

According to various embodiments, the antenna 430 may be disposed in a length direction parallel to the one axis.

The electronic device 400 according to various embodiments may include the controller 420 used in at least one of VR, AR or MR and gripped by a hand of a user 420, the antenna 430 disposed in the controller 420, and the processor 450 connected to the antenna 430.

According to various embodiments, the processor 450 may be configured to measure a return loss of the antenna 430 while radiating a radio frequency signal through the antenna 430, detect whether a thumb and a finger of the hand touch each other based on the measured return loss, and provide an interaction for the touch between the thumb and the finger.

The aforementioned device may be implemented as a hardware component, a software component and/or a combination of a hardware component and software component. For example, the device and component described in the embodiments may be implemented using a processor, a controller, an arithmetic logic unit (ALU), a digital signal processor, a microcomputer, a field programmable gate array (FPGA), a programmable logic unit (PLU), a microprocessor or one or more general-purpose computers or special-purpose computers, such as any other device capable of executing or responding to an instruction. The processing device may perform an operating system (OS) and one or more software applications executed on the OS. Furthermore, the processing device may access, store, manipulate, process and generate data in response to the execution of software. For convenience of understanding, one processing device has been illustrated as being used, but a person having ordinary skill in the art may understand that the processing device may include a plurality of processing elements and/or a plurality of types of processing elements. For example, the processing device may include a plurality of processors or a single processor and a single controller. Furthermore, a different processing configuration, such as a parallel processor, is also possible.

Software may include a computer program, a code, an instruction or a combination of one or more of them and may configure a processing device so that the processing device operates as desired or may instruct the processing devices independently or collectively. The software and/or the data may be embodied in any type of machine, a component, a physical device, a computer storage medium or a device in order to be interpreted by the processor or to provide an instruction or data to the processing device. The software may be distributed to computer systems connected over a network and may be stored or executed in a distributed manner. The software and the data may be stored in one or more computer-readable recording media.

The method according to various embodiments may be implemented in the form of a program instruction executable by various computer means and stored in a computer-readable medium. In this case, the medium may continue to store a program executable by a computer or may temporarily store the program for execution or download. Furthermore, the medium may be various recording means or storage means having a form in which one or a plurality of pieces of hardware has been combined. The medium is not limited to a medium directly connected to a computer system, but may be one distributed over a network. Examples of the medium may be magnetic media such as a hard disk, a floppy disk and a magnetic tape, optical media such as a CD-ROM and a DVD, magneto-optical media such as a floptical disk, and media configured to store program instructions, including, a ROM, a RAM, and a flash memory. Furthermore, other examples of the medium may include recording media and/or storage media managed in an app store in which apps are distributed, a site in which various other pieces of software are supplied or distributed, a server, etc.

Various embodiments of this document and the terms used in the embodiments are not intended to limit the technology described in this document to a specific embodiment, but should be construed as including various changes, equivalents and/or alternatives of a corresponding embodiment. Regarding the description of the drawings, similar reference numerals may be used in similar elements. An expression of the singular number may include an expression of the plural number unless clearly defined otherwise in the context. In this document, an expression, such as "A or B", "at least one of A and/or B", "A, B or C" or "at least one of A, B and/or C", may include all of possible combinations of listed items together. Expressions, such as "a first," "a second," "the first" or "the second", may modify corresponding elements regardless of its sequence or importance, and are used to only distinguish one element from the other element and do not limit corresponding elements. When it is described that one (e.g., a first) element is "(functionally or communicatively) connected to" or "coupled with" the other (e.g., a second) element, one element may be directly connected to the other element or may be connected to the other element through another element (e.g., a third element).

The term "module" used in this document may include a unit implemented as hardware, software or firmware, and may be interchangeably used with a term, such as logic, a logical block, a part, or a circuit. The module may be an integrated part or a minimum unit in which one or more functions are performed or a part thereof. For example, the module may be implemented as an application-specific integrated circuit (ASIC).

According to various embodiments, each (e.g., a module or a program) of the aforementioned elements may include a single entity or a plurality of entities. According to various embodiments, one or more of the aforementioned components or steps may be omitted or one or more other components or steps may be added. Alternatively or additionally, a plurality of components (e.g., modules or programs) may be integrated into a single component. In such a case, the integrated component may identically or similarly perform a function performed by a corresponding one of the plurality of components before one or more functions of each of the plurality of components. According to various embodiments, steps performed by a module, a program or another component may be executed sequentially, in parallel, iteratively or heuristically, or one or more of the steps may be executed in different order or may be omitted, or one or more other steps may be added.

The embodiments of the disclosure in which an exclusive property or privilege is claimed are defined as follows:

1. An operating method of an electronic device, comprising:
    radiating a radio frequency signal through an antenna;
    introducing an electric field into a thumb and a finger with the radio frequency signal;
    measuring a return loss of the antenna by measuring a reflected portion of the radio frequency signal returned through the antenna; and
    determining if the magnitude of the reflected portion of the radio frequency signal is greater than or less than a predetermined threshold value to detect whether the thumb and the finger touch each other.

2. The operating method of claim 1, further comprising: providing an interaction for the touch between the thumb and the finger.

3. The operating method of claim 2, wherein the interaction comprises an interaction in one of virtual reality (VR), augmented reality (AR) or mixed reality (MR).

4. The operating method of claim 3, wherein the interaction comprises at least one of an execution of a predetermined function, a pick-up of a virtual object at positions of the thumb and the finger, or an entry of text at the positions of the thumb and the finger.

5. The operating method of claim 1, wherein the return loss of the antenna changes in response to a change in combined impedance between the antenna, and the thumb and the finger according to the touch between the thumb and the finger.

6. The operating method of claim 1, wherein the detecting whether the thumb and the finger touch each other comprises detecting the touch between the thumb and the finger when the magnitude of the reflected portion of the radio frequency signal greater than 20 dB.

7. The operating method of claim 6, wherein the detecting whether the thumb and the finger touch each other are touched further comprises:
    tracking a change value of the measured return loss; and
    detecting the touch between the thumb and the finger when the change value is greater than a predetermined threshold value.

8. The operating method of claim 1, wherein the touch between the thumb and the finger indicates that a finger pinch is formed as the thumb and the finger come into contact with each other.

9. The operating method of claim 1, wherein the antenna is disposed in a controller gripped by the thumb and the finger.

10. An electronic device comprising:
an antenna positioned and configured to radiate a radio frequency signal and induce an electric field into a thumb and a finger with the radio frequency signal; and
a processor connected to the antenna and configured to measure a return loss of the antenna by measuring a reflected portion of the radio frequency signal returned through the antenna while radiating the radio frequency signal through the antenna and determining if the magnitude of the reflected portion of the radio frequency signal is greater than or less than a predetermined threshold value to detect whether the thumb and the finger touch each other.

11. The electronic device of claim 10, wherein the processor is configured to provide an interaction for the touch between the thumb and the finger.

12. The electronic device of claim 11, wherein the interaction comprises an interaction in one of virtual reality (VR), augmented reality (AR) or mixed reality (MR).

13. The electronic device of claim 12, wherein the interaction comprises at least one of an execution of a predetermined function, a pick-up of a virtual object at positions of the thumb and the finger, or an entry of text at the positions of the thumb and the finger.

14. The electronic device of claim 10, wherein the return loss of the antenna changes in response to a change in combined impedance between the antenna, and the thumb and the finger according to the touch between the thumb and the finger.

15. The electronic device of claim 10, wherein the processor is configured to detect the touch between the thumb and the finger when the magnitude of the reflected portion of the radio frequency signal is greater than 20 dB.

16. The electronic device of claim 15, wherein the processor is configured to:
track a change value of the measured return loss, and
detect the touch between the thumb and the finger when the change value is greater than a predetermined threshold value.

17. The electronic device of claim 10, wherein the touch between the thumb and the finger indicates that a finger pinch is formed as the thumb and the finger come into contact with each other.

18. The electronic device of claim 10, wherein:
the electronic device comprises an electronic device comprising a controller gripped by the thumb and the finger, and
the antenna is disposed in the controller.

19. The electronic device of claim 18, wherein:
the controller is gripped by the thumb and the finger on a basis of one axis defined to penetrate the controller, and
the antenna is disposed in a length direction parallel to the one axis.

20. An electronic device used in at least one of virtual reality (VR), augmented reality (AR) or mixed reality (MR), comprising:
a controller gripped by a hand of a user;
an antenna disposed in the controller and positioned and configured to radiate a radio frequency signal and induce an electric field into a thumb and a finger of the hand with the radio frequency signal; and
a processor connected to the antenna,
wherein the processor is configured to:
measure a return loss of the antenna by measuring a reflected portion of the radio frequency signal returned through the antenna while radiating a radio frequency signal through the antenna,
determine if the magnitude of the reflected portion of the radio frequency signal is greater than or less than a predetermined threshold value to detect whether the thumb and the finger of the hand touch each other, and
provide an interaction for the touch between the thumb and the finger.

* * * * *